(No Model.)
J. F. SMITH.
HAY PRESS.
No. 437,524. Patented Sept. 30, 1890.
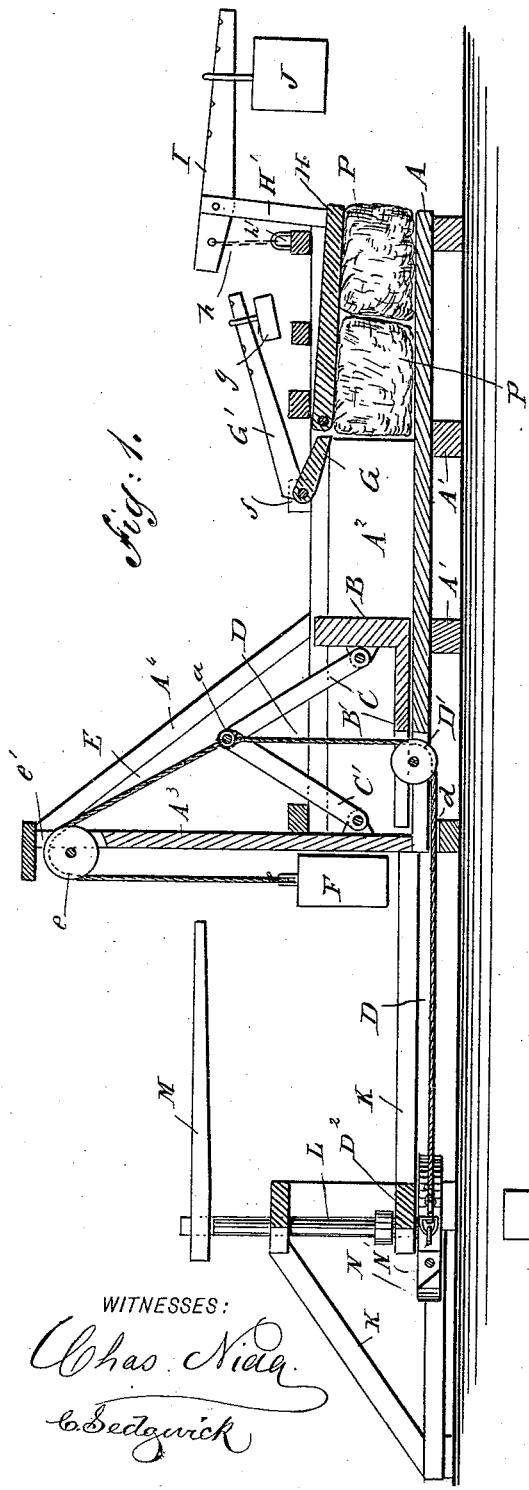
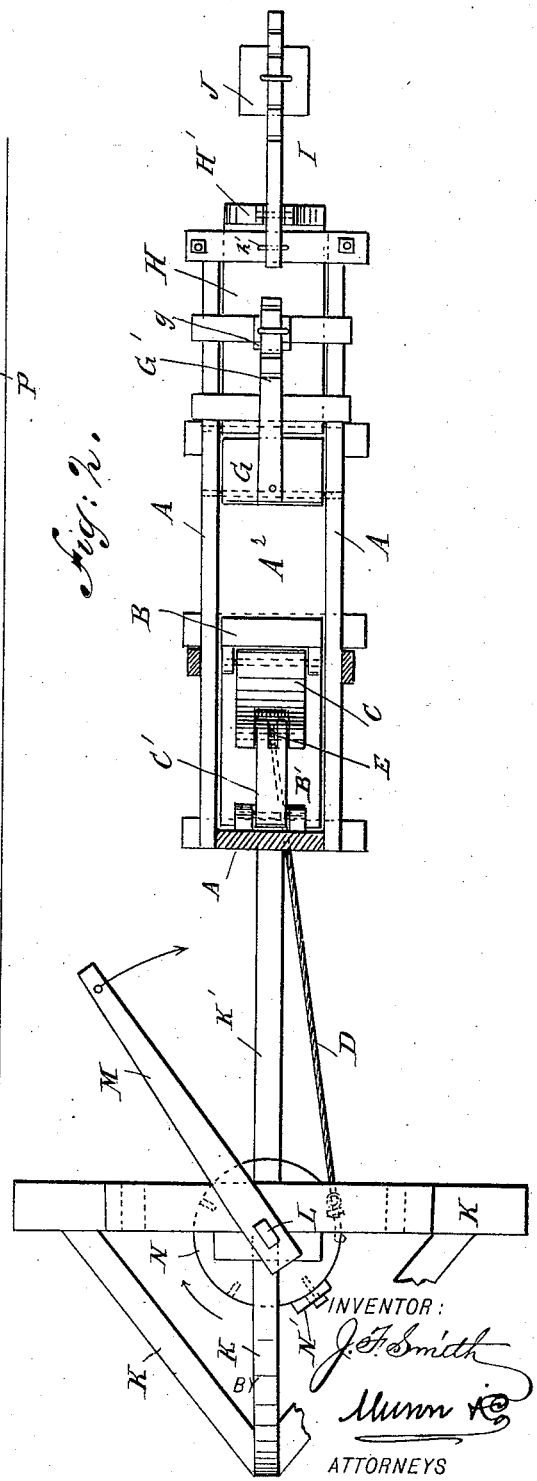
WITNESSES:
Chas. Nider.
C. Sedgwick.
INVENTOR:
J. F. Smith
BY Munn & Co.
ATTORNEYS
THE NORRIS PETERS CO., PHOTO-LITHO., WASHINGTON, D. C.

UNITED STATES PATENT OFFICE.

JOHN F. SMITH, OF BROWNWOOD, TEXAS.

HAY-PRESS.

SPECIFICATION forming part of Letters Patent No. 437,524, dated September 30, 1890.

Application filed May 20, 1890. Serial No. 352,476. (No model.)

*To all whom it may concern:*

Be it known that I, JOHN F. SMITH, of Brownwood, in the county of Brown and State of Texas, have invented a new and Improved Hay-Press, of which the following is a full, clear, and exact description.

My invention relates to improvements in machines for baling hay, although it may be used for baling other material; and the object of my invention is to produce a press that will be simple in construction and comparatively inexpensive, and that will operate rapidly and well.

To this end my invention consists in a horizontal frame having at its open end a pivoted and weighted abutment, a plunger adapted to reciprocate in the frame, a toggle-lever connecting the plunger with the closed end of the frame, and means for actuating the toggle-lever. This construction will be hereinafter fully described, and specifically pointed out in the claims.

Reference is to be had to the accompanying drawings, forming a part of this specification, in which similar letters of reference indicate corresponding parts in both the figures.

Figure 1 is a vertical longitudinal section of the device embodying my invention. Fig. 2 is a broken plan view of the same, partly in section.

The frame A is preferably rectangular in shape, and it rests upon suitable cross-sills A'. The frame is open at one end to permit the passage of the bales therefrom, and the inner diameter of the frame corresponds to the size of the bales which are to be pressed therein. The frame is provided with a suitable hopper $A^2$, which is open at the top, and into which the hay to be pressed is inserted, and with an upwardly-extending portion $A^3$, which closes the front end of the frame.

A plunger B fits closely within the frame and is provided with a horizontal portion B', which slides upon the bottom of the frame. The plunger B is actuated by the toggle-levers C and C', the lever C being pivoted to the back portion of the plunger, the lever C' being pivoted to the vertical portion $A^3$ of the frame in alignment with the lever C, and the two levers being pivoted together by the rod $a$, to which is attached a rope D, which extends downwardly over a pulley D', pivoted in the bottom of the frame, and forwardly through a recess $d$ in one of the cross-pieces of the frame, and is attached to the drum of the horse-power, as hereinafter described. The rope D is provided with a suitable swivel $D^2$ to prevent it from twisting, and a rod and chain may be substituted for the rope. A rope E is also attached to the rod $a$ and extends upwardly over a pulley $e$, which is pivoted in a recess $e'$ of the vertical portion $A^3$, and said rope has attached to its free end a weight F, so that when the levers C and C' have been straightened and the plunger B moved rearwardly in the frame A, and the power is released from the rope D, said weight will raise the central ends of the levers C and C', and pull back the plunger to the forward end of the frame.

A choking-piece G is pivoted in the upper portion of the frame A in the rear of the hopper $A^2$, said choking-piece being fixed to the rod $f$, which is pivoted in the frame A, and to which is attached a rearwardly-extending lever G', having a weight $g$ hung thereon, said weight having the tendency to depress the lever and the choking-piece G, so as to partially compress the hay in the hopper.

An abutment H is pivoted in the upper portion of the frame A, just behind the choking-piece G, said abutment being sufficiently wide to fill the inner portion of the frame and being long enough to extend to the rear end of the frame.

A vertical arm H' is fixed to the upper rear end of the abutment H, and pivoted in the top of the said arm is a lever I, the long end of which extends rearwardly. The short end of the lever I is connected by a chain $h$ with a staple $h'$, which is fixed to a cross-piece on the rear end of the frame A, and suspended from the long end of the lever I is a weight J, which forces the rear end of the abutment downwardly, so as to compress the hay, which is forced between the said abutment and the bottom of the frame A.

The power-frame K is located in front of the frame A, and is connected thereto by a bar K'. A vertical shaft L is mounted in the frame K, the upper end of the said shaft being squared and provided with a suitable sweep M, and the lower end of the said shaft having fixed thereto a drum N, to which one end of the rope D is attached. Fixed to the drum N, adjacent to the point at which the rope D is attached, is an inclined or beveled block N', the bevel portion of said block extending diagonally across the face of the drum, so that when the drum is turned the rope D will be wound thereon until it reaches the block N', when it will follow the bevel portion of the block and be forced from the drum, thus allowing the plunger in the frame A to be retracted.

To operate the device, the hay to be pressed is inserted in the hopper $A^2$, and power is applied to the sweep M, which will turn the drum N, and by means of the connecting-rope D will depress the connected ends of the levers C and C', thus moving the plunger rearwardly, and forcing the hay to the back portion of the frame A, the hay being partially compressed by the choking-piece G, so that it readily enters between the abutment H and the bottom of the frame A'. At each stroke of the plunger B the rope D will be forced from the drum N by the bevel-block N', and the weight F, acting on the rope E and levers C and C', will retract the plunger B, so that it will be ready for another operation. The frame should be sufficiently long to hold one or more bales P between the hopper $A^2$ and the rear of the frame, and said bales will serve as abutments to give additional solidity to the bales which are subsequently formed. It will readily be seen that the solidity of the bales may be regulated by increasing the size of the weights J and $g$, or by changing their position upon the levers I' and G' as the abutment H bears upon the former bales and regulates their solidity by the tension thereon, said abutment holding the bales sufficiently to enable them to serve as abutments for a succeeding bale.

Having thus fully described my invention, I claim as new and desire to secure by Letters Patent—

1. A hay-press consisting, essentially, of a horizontal frame containing a reciprocating plunger, a choking-piece pivoted in the top of the frame and provided with a rearwardly-extending weighted lever, an abutment pivoted in the rear of the choking-piece, said abutment having an upwardly-extending arm, and a lever pivoted in the arm, said lever having one end connected with the frame and the other end provided with a weight, substantially as described.

2. A hay-press consisting, essentially, of a frame open at one end, and having an opening in the top through which hay may be inserted, a reciprocating plunger located within the frame, toggle-levers pivoted to the plunger and to the closed end of the frame, means for actuating said levers, a choking-piece pivoted in the upper portion of the frame in the rear of the top entrance, and provided with a rearwardly-extending lever having a weight attached thereto, an abutment pivoted in the upper portion of the frame in the rear of the said choking-piece and provided with an upwardly-extending arm, and a lever pivoted in said arm and having one end connected with the frame and the other provided with a suitable weight whereby the abutment may be depressed, substantially as described.

3. The combination, with the frame A, open at the rear end and at the top and having the choking-piece G and abutment H pivoted therein and connected with weighted levers, as shown, of the plunger B, adapted to reciprocate in the frame, the toggle-levers C and C', connecting the plunger with the forward end of the frame, the rope D, attached to the pivot-rod of the said toggle-levers and connecting over a pulley D' with the power-drum N, and the rope E, attached to the pivot-rod of the toggle-levers and extending upwardly over the pulley $e$ and having its free end provided with a weight F, adapted to raise the toggle-levers and retract the plunger, substantially as described.

JOHN F. SMITH.

Witnesses:
C. H. JENKINS,
C. L. McCARTNEY.